United States Patent

[11] 3,619,777

| [72] | Inventor | Jacques Terry<br>14 Allee Diamont Foret de Vernon, 26<br>Vernon 6, France |
|---|---|---|
| [21] | Appl. No. | 807,666 |
| [22] | Filed | Mar. 17, 1969 |
| [45] | Patented | Nov. 9, 1971 |
| [32] | Priority | Mar. 15, 1968 |
| [33] | | France |
| [31] | | 143895 |

[54] PRECISION MEASURING NETWORK HAVING PRIMARY ELEMENTS OF HIGHLY CAPACITIVE IMPEDANCE
3 Claims, 11 Drawing Figs.

[52] U.S. Cl. .................................................. 324/140 R, 324/74
[51] Int. Cl. ...................................................... G01r 7/00, G01r 35/04
[50] Field of Search ........................................... 324/56, 109, 140, 74

[56] References Cited

UNITED STATES PATENTS

| 2,178,225 | 10/1939 | Diehl et al. .................. | 324/56 |
| 2,458,665 | 1/1949 | Willard ........................ | 324/56 |
| 2,967,995 | 1/1961 | Pochmerski .................. | 324/56 |

OTHER REFERENCES

Gerber, Proc. IRE, Sept. 1953, pp. 1103– 1112. Copy in 324/56.

*Primary Examiner*—Alfred E. Smith
*Attorney*—Waters, Roditi, Schwartz & Nissen

ABSTRACT: Precision measuring network including a plurality of piezoelectric detectors and associated circuits and a control and calibrating apparatus including a calibrating oscillator, a measuring instrument and a control. The circuits are connected to the detectors by calibrated cables. A calibration signal from the oscillator is applied to a capacitive voltage divider constituted by the detector and cables and stray capacitances. The circuits are packaged in sealed cylindrical housings.

3,619,777

PRECISION MEASURING NETWORK HAVING PRIMARY ELEMENTS OF HIGHLY CAPACITIVE IMPEDANCE

SUMMARY OF THE INVENTION

The present invention relates to a multichannel remote measuring system. Types of remote measuring equipment are known which, for the purpose of calibrating the detectors of information associated with the different channels, possess a calibrating oscillator capable of supplying a calibrating AC voltage applied through a plurality of sensors. Generally, however, the remote measuring equipment heretofore known does not allow effecting in a single operation and simultaneously prior to measurement, the calibration of a considerable number of sensors connected at points not necessarily having identical potential. The present invention endeavors to solve this problem by creating a measuring system provided with various means for rapid calibration.

To achieve this purpose, a measuring circuit is provided comprising a plurality of piezoelectric detectors and associated detector circuits, a calibration, an oscillator means for coupling the detector circuits to the oscillator, and calibrated cables coupling the detectors to the detector circuits, the means including adjustable capacitor, the detectors having straight capacitances and capacitances which together with the adjustable capacitor constitutes capacitance voltage dividers.

DRAWINGS

DETAILED DESCRIPTION

Figure 1:
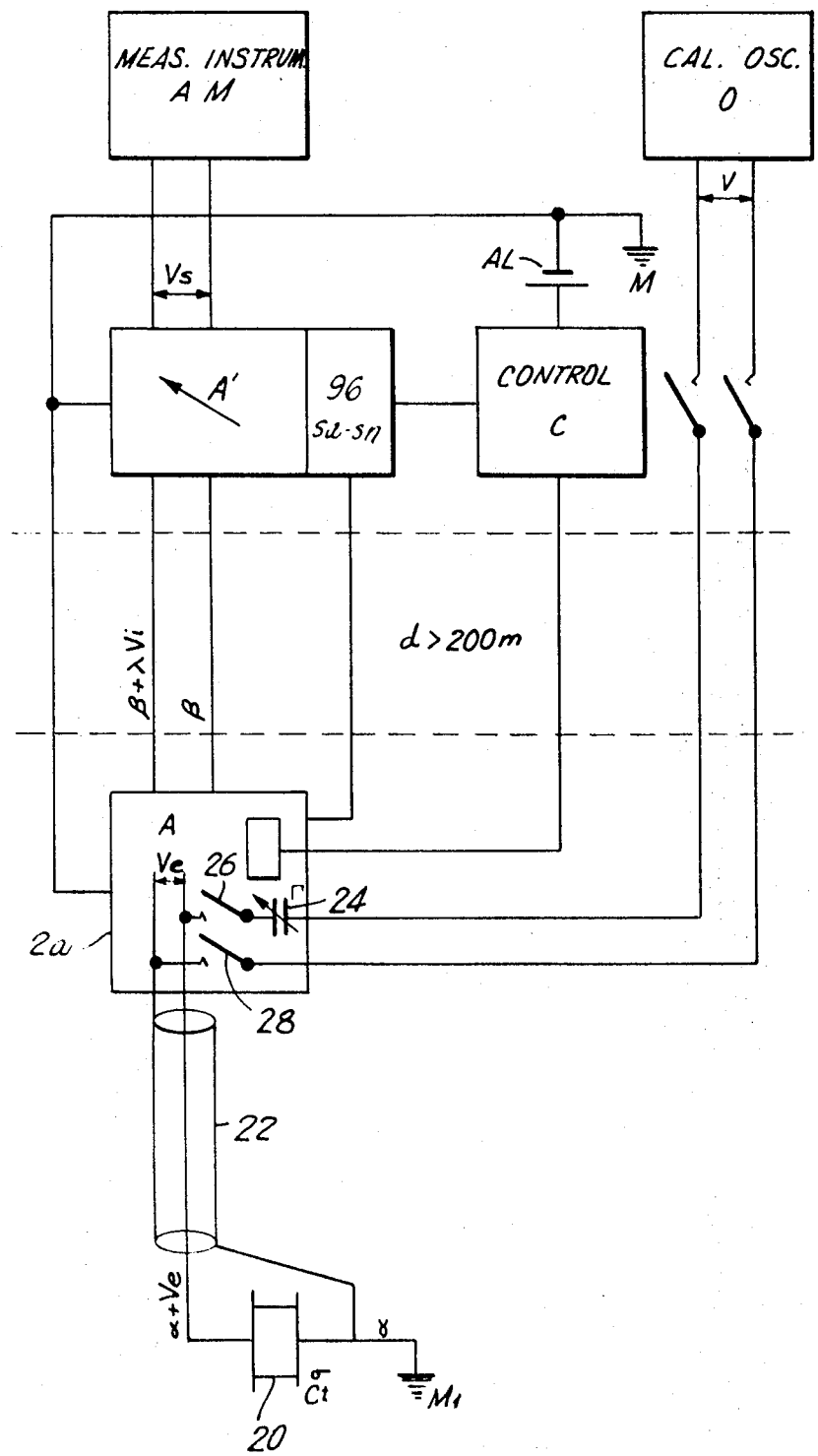
FIG. 1 is an overall schematic and block diagram of a network provided in accordance with the invention.

A complete measuring network, in accordance with the invention, consists of, for example, 16 independent assemblies A associated with 16 piezoelectric detectors 20, and one control and calibrating bay including:

a. 16 assemblies A' associated with the aforementioned assemblies A,
b. one calibrating oscillator O,
c. one measuring instrument with its associated circuits A.M.,
d. one control assembly C, and
e. one general power supply AL.

The assemblies A are directly connected to the detectors 20 by their calibrated cables 22. They make possible the long distance transmission of the measurement, with ordinary mode suppression, this measurement being made in open air at temperatures which may attain several hundred degrees and under vibratory conditions which may attain 40 G's. They also make possible remote verification, before measuring, of the detectors and calibration of the complete channels.

The assemblies A' are connected, wire for wire, to the A assemblies. They make possible the energizing of all the equipment of a channel, and the protection of the circuits so that a failure in any channel will not disturb the operation of the others. They also make possible the adjustment of gain for each channel and the transmission, at low impedance to a recorder, of signals with desired amplitude.

The calibrating oscillator O furnishes a pure sinusoidal signal, very stable in frequency and at a strictly constant amplitude which can be selected at four different levels.

The control assembly C consists of three keyboards, relays and logical circuits and makes it possible to exercise the following control, verification and calibration functions: control of the channels, one by one, or simultaneously; control of the oscillator and selection of the channels to be calibrated; null verification for each channel; control of gain for each channel and calibration; verification of linearity for each channel; verification of the response of each channel to a mechanical excitation; and simultaneous calibration of all the channels by the transmission of calibrated-level signals to all channels of the recorder.

Knowing the characteristics of a given detector, one applies to the input of the corresponding assembly A, which is normally coupled to its detector 20 by the coaxial cable 22, a signal corresponding to a given multiple N of "$g$." If $\sigma$ is the sensitivity of the detector expressed in mv./g., a voltage $$V_e = N\sigma(\text{mv.})$$

is determined.

For this purpose, the calibration signal V of the oscillator O is applied to a capacitance voltage divider constituted, on the one hand, by the detector (capacitance $C_e$ consisting of the capacitance of the detector proper and of the connection cable, as well as of stray capacitances which are reduced to a minimum by the circuit), and on the other hand, by an adjustable capacitance $\Gamma$ of small value, which is provided by capacitor 24 connected immediately at the input to the A assembly by a vacuum type reed relay having two N/O contacts 26 and 28, for the purpose of eliminating the capacitance of the connection cables. All this equipment is carefully insulated for reducing stray capacitances and maintaining the precision of the divider bridge. There results:

$$V_e = \frac{\Gamma}{C_e + \Gamma} = N\sigma$$

This relationship is assured by the adjustment of $\Gamma$. $\beta$ has a small value: for considerations of mechanical behavior; in order to facilitate adjustment; in order not to load the detector, in the event that $\Gamma$ were inadvertently left in circuit during a measuring operation. In this case a systematic error of 10 percent would be committed.

Since the impedance of the divider bridge is very high, the voltage $V_e$ is measured at the output of the input stages.

Calibration of the measuring channel is done by adjusting the gain of assembly A' so that a signal $V_A$ of given amplitude is obtained.

In this manner, the relationship:

$$N(\text{in g.}) \rightarrow V_A \text{ (in volts)}$$

has been established, and the same can be done for all the channels.

Since the calibrating signal V is invariably the same, calibration of the recorder may be effected simultaneously for all the channels. It should be noted that this method will expose any eventual fault in the detector or in the cable.

Figure 2:
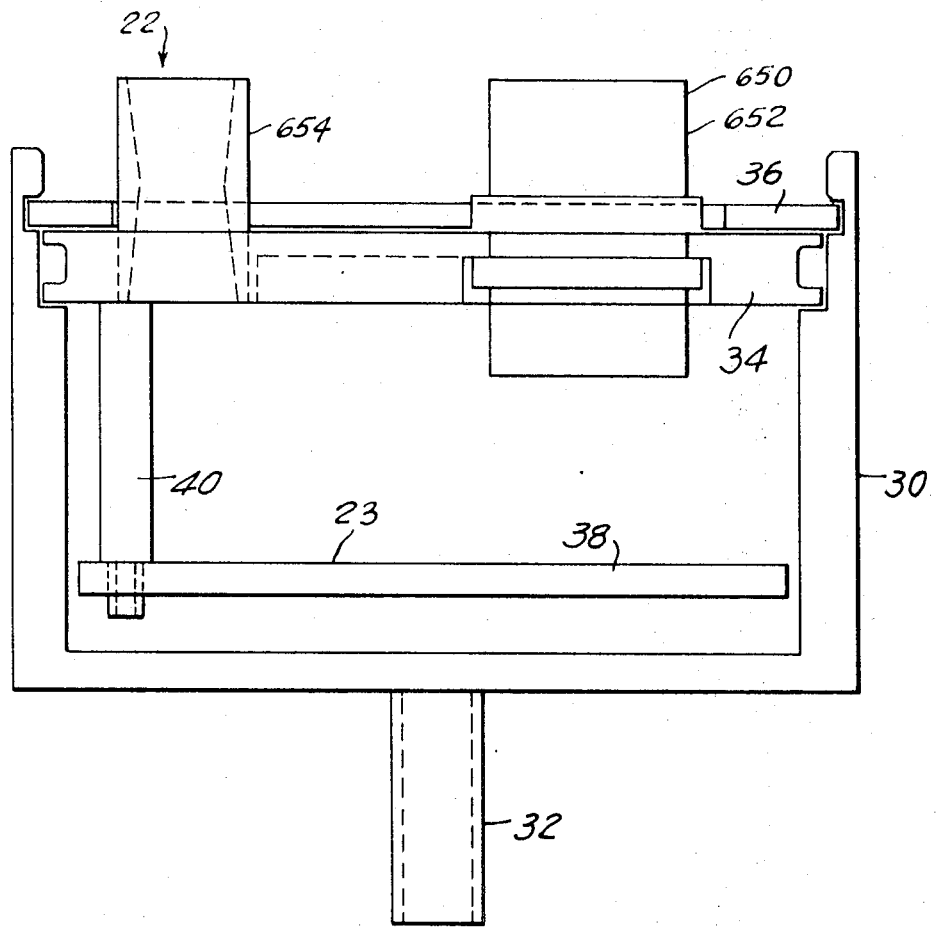
FIG. 2 is a diagrammatic illustration of the packaging of certain circuit components of the network.
Figure 3:
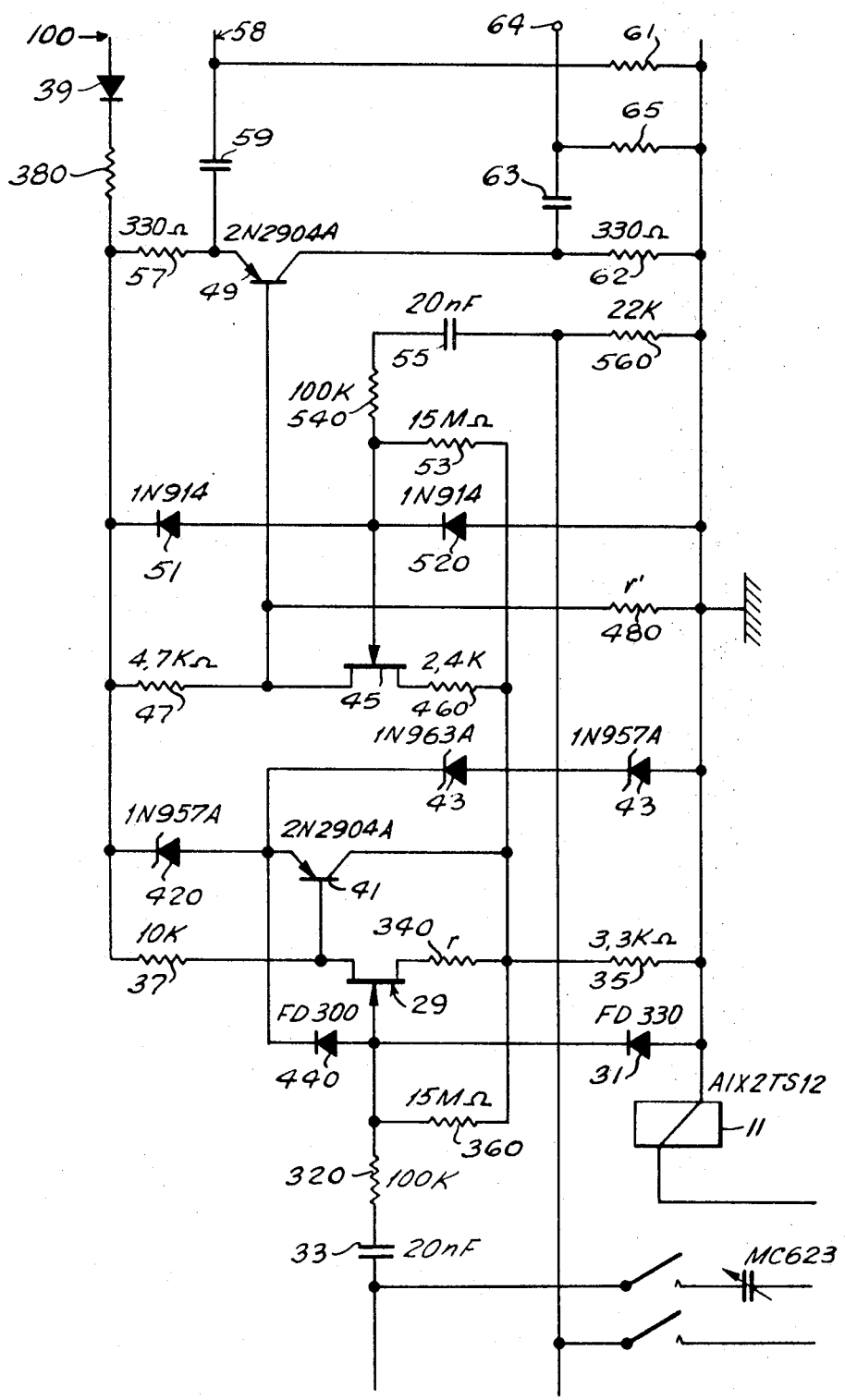
FIG. 3 is a schematic diagram of a printed circuit board used in the structure of FIG. 2.

Assemblies A are shown in FIGS. 2 and 3. These assemblies are packaged in sealed cylindrical housings 30 for easy mounting and protection from heat convection and corrosion. They are fastened by means of an axial screw 32. All internal components are solidly attached to the cover 34 which is provided with an hermetic seal and held in place by a snapring 36 which can be removed easily to gain access to the inside.

The internal arrangement comprises the capacitance divider and its control relay mounted on an insulated and suspended printed circuit board 38; and the matching circuit, of an input impedance exceeding 500 megohms for ordinary mode rejection, for wide band pass (0.3 to 20,000 Hz.) and symmetrical, low-impedance outputs.

This circuit, on a printed circuit board with three mounting posts 40, contains a field effect and $p$-$n$-$p$ transistor stage of unity gain. With its "source" output, this stage loads a second, amplifying field effect transistor, whose "gate" output is controlled by the ground side of the detector. The output stage is symmetrical.

Power is supplied from the control bay through a sealed outlet, and the coaxial cable of the detector introduces the signal directly to the printed circuit via an insulated connection terminal after passing through a sealed tubular bushing to which the protective sheath of the cable is attached.

The 16 assemblies A', which are arranged in the bay inside a molded container consist of plug-in circuit cards combining a control and protective circuit with an adjustable amplifying circuit.

The control and protective circuit (FIG. 4) includes on the one hand, a resistor 50 of high, positive temperature coefficient, CTP, one diode 52 and one low-value resistor 54, through which the feed current passes and, on the other hand, a switching transistor 56 mounted in series with a signal light 58. The voltage, which shows up at the terminals of the diode and the resistor, as soon as assembly A is energized, controls the switching transistor causing the signal lamp to light up. In case of overcurrent, the heating up of the resistor CTP increases its resistance considerably and the voltage across its terminals becomes equal to the voltage supply. Thus, the power supply is protected and the normal operation of all other channels assured. The signal lamp, since it is connected upstream from the CTP resistor, goes out. Thus, abnormal extinction of the signal light means "open circuit," or "short circuit."

The amplifier circuit is a symmetrical amplifier, the first stage of which is supplied with constant current, and whose output stage is a push-pull series amplifier supplying a 200 ohm potentiometer. The amplitude of the output signal attains ±8 volts. The circuit is designed for controlling a magnetic recorder by voltage, or a moving coil loop by current.

Figure 9:
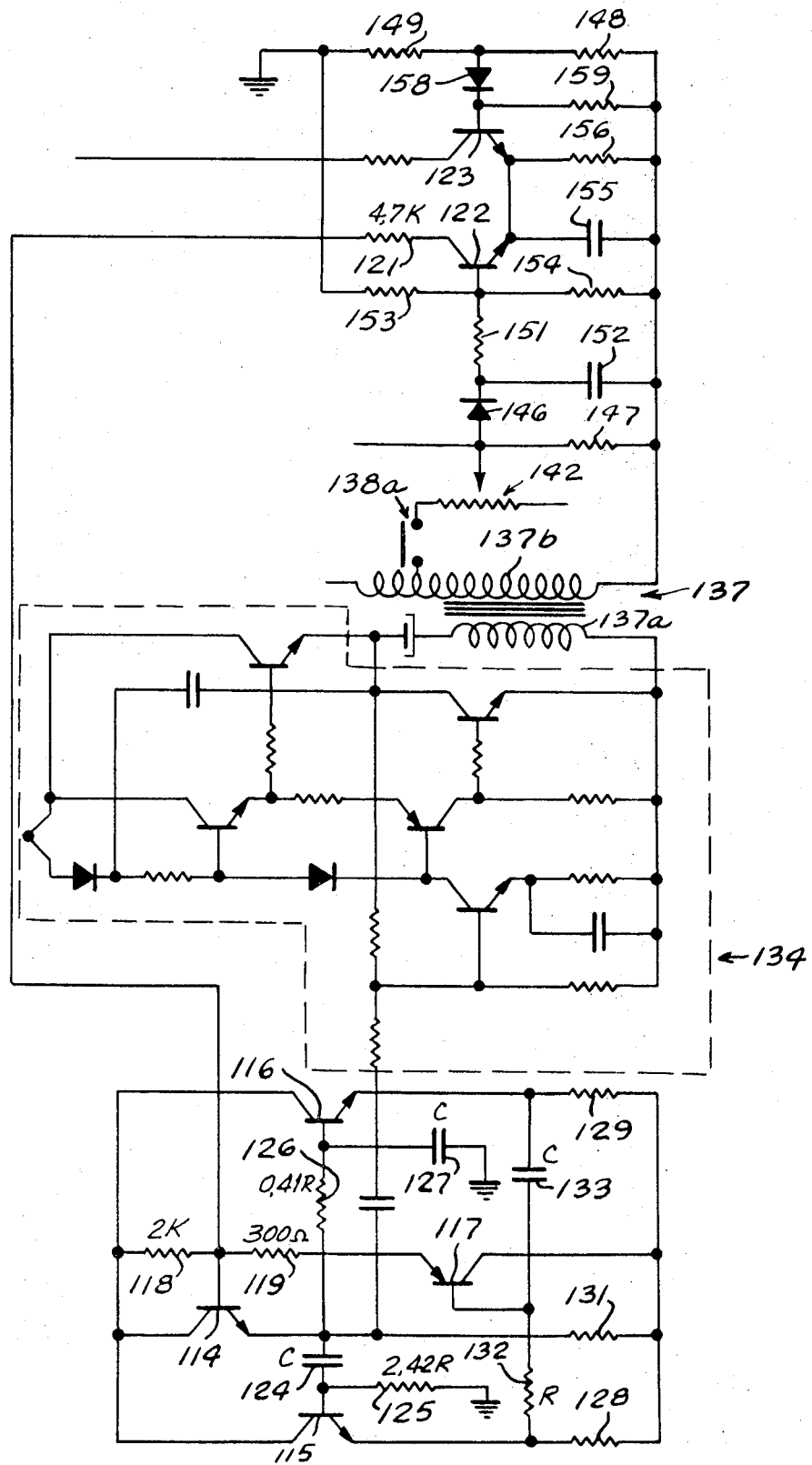
FIG. 9 is a schematic diagram of an oscillator used in the network of FIG. 1.

The oscillator O (FIG. 9) is based upon a little utilized peculiarity of three-pole circuits.

Figure 5:
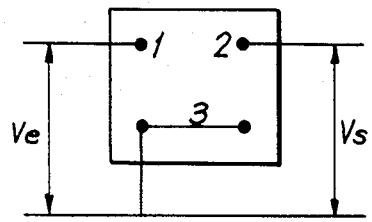
FIGS. 5–8 are schematic diagrams illustrating certain theories of the invention.
Figure 6:
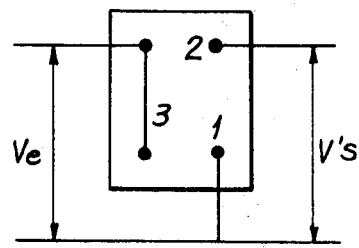

If the triple-pole circuit of FIG. 5 possesses a transfer function T, which for the frequency $f_o$ will represent a phase rotation by 180° and an attenuation $\alpha$, this same circuit, in reverse —FIG. 6—possesses a transfer function
$$T'=1-T$$
which, for the frequency $f_o$ is real and greater than $1: T'=1+\alpha$.

Figure 7:
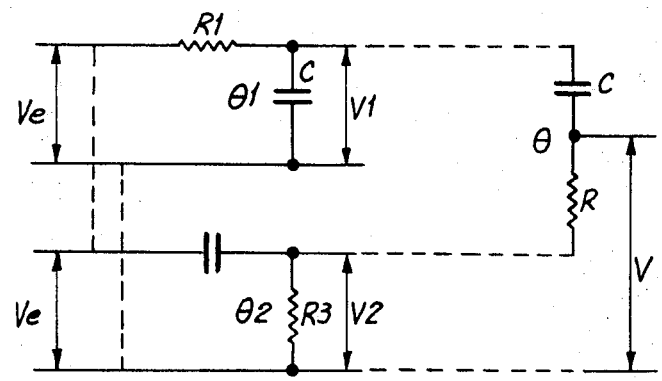

This property is applied to the double-T bridge, broken down into simple RC circuits, separated by emitter follower stages, which attenuate their mutual loading effect (FIG. 7).

If the time constants $\theta$, $\theta_1$, $\theta_2$ of the circuit of FIG. 7 are related according to $\theta=1/\alpha\theta_1=\alpha\theta_2$,
then the transfer function of the circuit is:

$$T=\frac{(\alpha+1)\theta p}{\alpha(\theta^2 p^2+1)+(\alpha^2+1)\theta_p}$$

At the frequency $f_o$, such that $\theta\omega_o=1$, the function T becomes:

$$T(f_o)=\frac{\alpha+1}{\alpha^2+1}$$

$T(f_o)$ has its maximum value, if one chooses $\alpha=0.41$ and the general expression is:

$$T=\frac{(2+\sqrt{2})\theta_p}{\theta^2 p^2+2\sqrt{2}\theta_p+1}$$

This function lies in the neighborhood of that of the Wien bridge; however, its poles being closer to each other, the rotation of the phase around $f_o$ is faster and the frequency stability is better.

Figure 8:
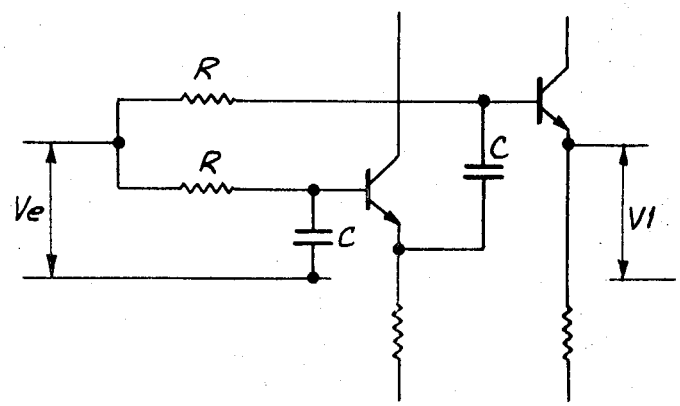

It is possible further to improve the frequency stability by replacing the circuits $R_1C$ and $R_2C$ by two identically stepped RC circuits (FIG. 8).

The transfer function for the assembly becomes:

$$T=\frac{3\theta_p}{(\theta_p+1)^2}$$

for the same frequency $f_0: T(f_o)=1.5$.

The advantage of such a circuit lies in the fact that in order to assure the stability of the oscillation, it is necessary only to complete the chain of the network by a resistive divider bridge. It is easy to control this attenuation, the principle being the same as that of a stabilized supply circuit, where a transistor plays the role of a variable resistor with considerable precision.

Four calibrated circuits make it possible to obtain four output levels. A potentiometer would permit continuous amplitude regulation. Since the circuits are completely independent, there can be no frequency variation in function of amplitude.

The control signal is derived from the output of a power amplifier, which is thus included in the general feedback loop. The usable signal is taken off from a one-fifth ratio reducing winding, whereby the output impedance is reduced to approximately 0.1 ohm.

Figure 10:
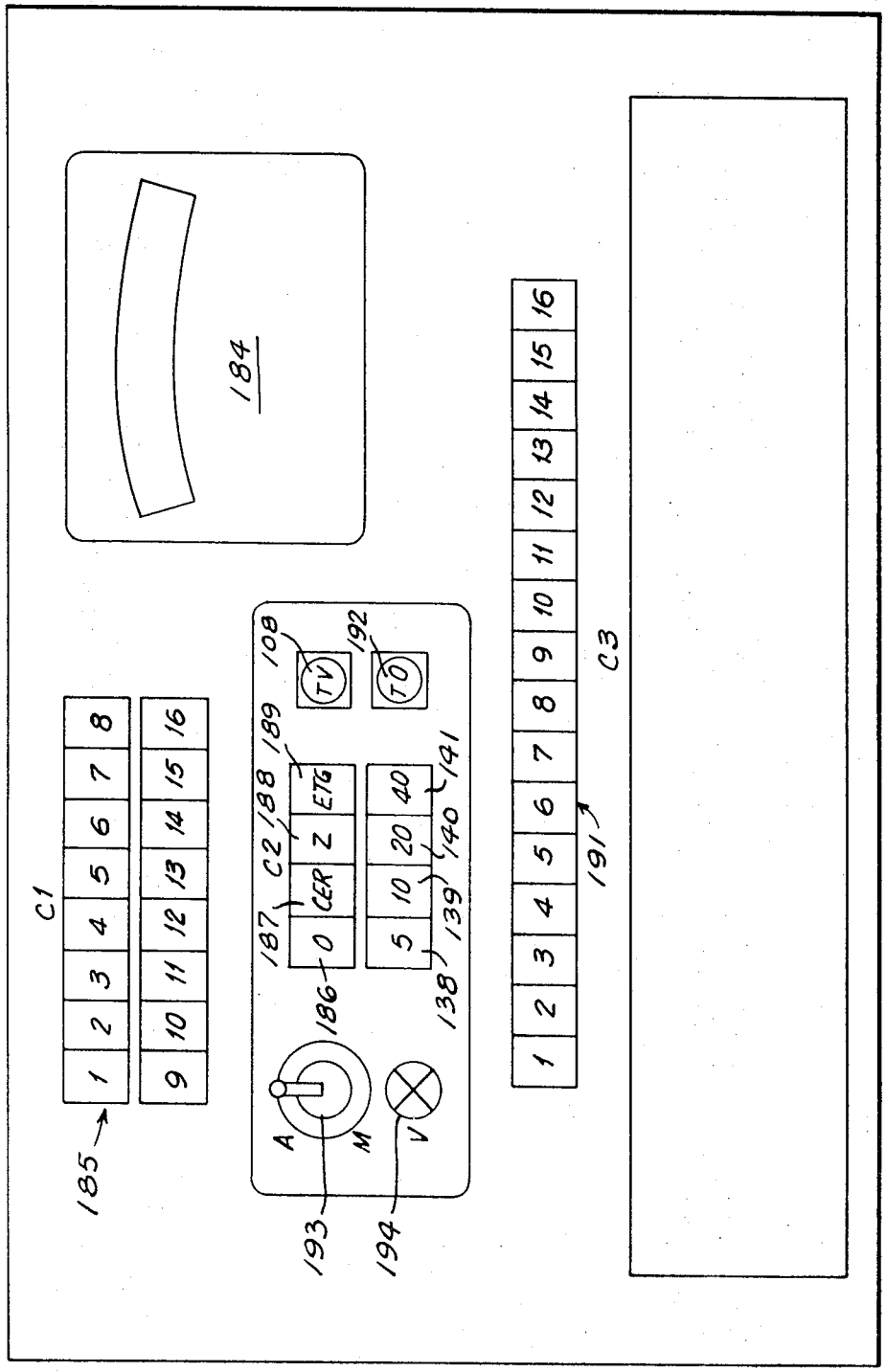
FIG. 10 illustrates a control panel of the network.
Figure 11:
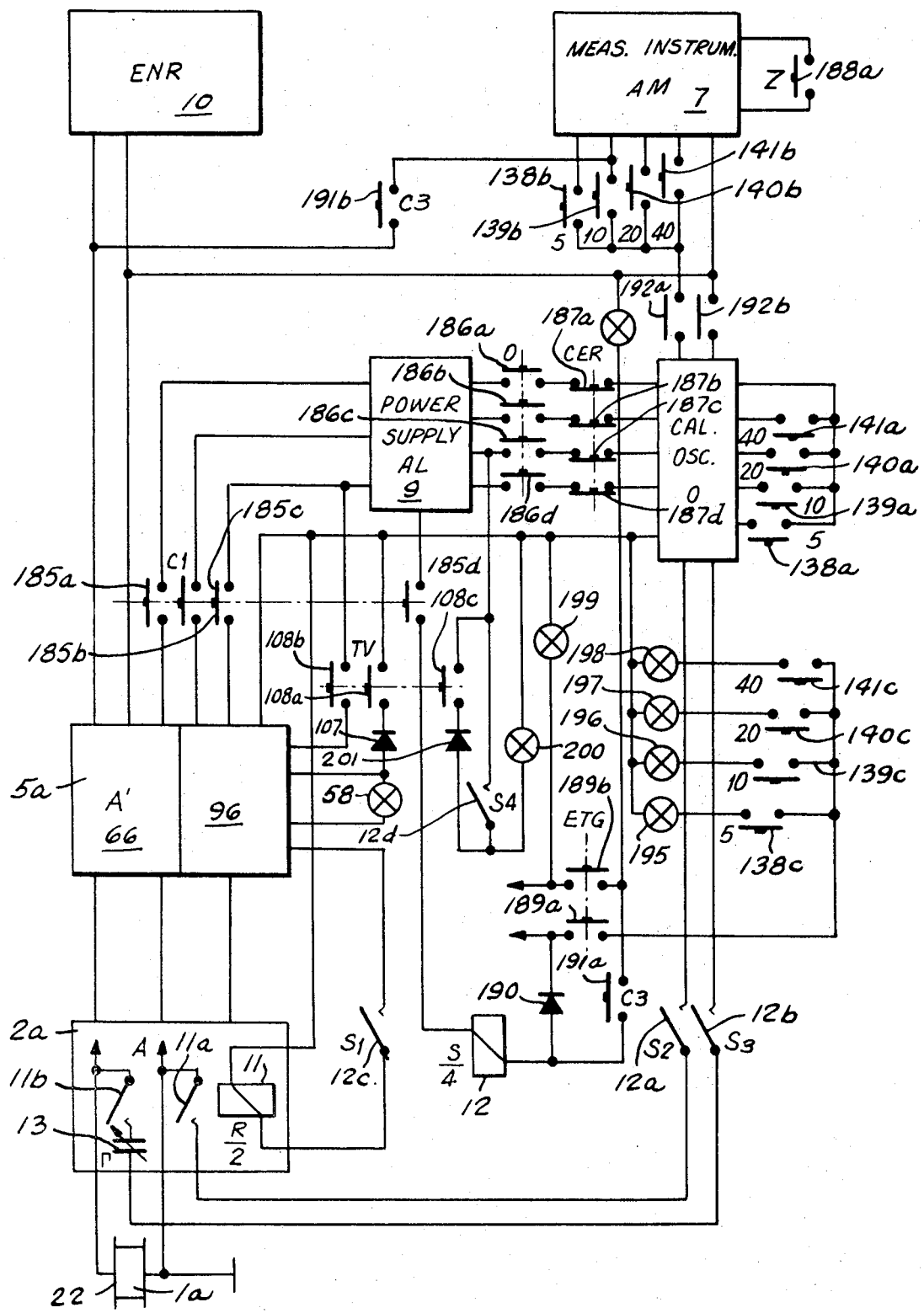
FIG. 11 is a schematic diagram of a control circuit of the network.

The control layout in the bay is represented in FIGS. 10 and 11. The keyboard $C_1$ consists of independent latch-in keys. It makes it possible to energize each channel independently of the others. The built-in signal light supervises the operation of the network as has been explained above.

The keyboard $C_2$ includes four exclusive keys, which make it possible to select one of the four voltages V of the calibrating oscillator, which correspond to 5–10–20 and 40 G's. Moreover it contains three other exclusive keys permitting to start operation, to shut down the reference oscillator and to connect the measuring instrument to the appropriate decade. A last independent key "General Calibration" completes the keyboard $C_2$.

The keyboard $C_3$ of exclusive latch-in keys makes it possible to connect the output of the calibrating oscillator to the channel to be calibrated, if same is energized, and to examine the output of the channel by means of the measuring instrument. The "General Calibration" key connects to the oscillator, via a diode logic circuit, all the channels energized for recording of the calibrating signals. These connections are made by relays, some of which are in the bay, others being located in the assemblies A.

A momentary contact key "Oscillator Test" makes it possible to verify the oscillator output on the measuring instrument.

Another momentary contact key "Pilot Light Text" makes it possible to verify over a diode logic circuit, the pilot lights of the bay.

The general switch energizes simultaneously all switched on channels. Its pilot light represents the synthesis of the operation of the various sources of voltage supply.

FIG. 3 is a schematic diagram of the matching circuit 23 which is a part of the measurement transmission and control device 2a. This matching circuit has an input impedance higher than 500 megohms (which actually lies between 800 and 1,000 megohms), and it has a common modes (phantom circuits rejecting characteristic, a wide pass band (from 0.3 to 20,000 Hz.) and offers symmetrical low-impedance outputs.

The matching circuit 23 comprises a first field effect transistor 29, whose base or gate electrode is connected, on the one hand, to ground via a diode 31, and, on the other hand, to the input terminal which is connected to the central conductor of the coaxial cable 22 via a resistor 320 and a capacitor 33. The emitter electrode of the field effect transistor is connected to ground via two resistors 340 and 35 in series, with the junction point of the two resistors being connected to the base electrode via a third resistor 360. The collector electrode of the transistor is connected via a resistor 37 to another resistor 380 which is connected by a diode 39 to a supply terminal 400 which, in operation, is maintained at a positive potential of, for example, 30 volts.

The circuit 23 includes furthermore a transistor 41 of the PNP type, the base of which is connected to the collector electrode of the FET transistor 29, whereas its collector is connected to the junction point between the two resistors 340 and 35. The emitter of the PNP transistor 41 is connected, on the one hand, to the junction point between Zener diodes 420 and 43 which lie in series between the junction point of resistors 37 and 380 and ground and, on the other hand, to the gate electrode of the FET transistor 29 via a diode 440.

The circuit 23 also possesses a second field effect transistor 43 whose source electrode is coupled by a resistor 460 to the collector of the transistor 41, i.e. to the junction point of resistors 340 and 35. The drain electrode of this FET 45 is connected to the resistor 380 via another resistor 47, to ground via resistor 480 and directly to the base of a PNP-type transistor 49. The gate of the FET 45 is connected to the junction point between the two diodes 51 and 520, series-connected between resistor 380 and ground, and, via a resistor 53, to the junction point of resistors 340 and 35. The gate of the FET 45 is also connected to ground over a resistor 540, a capacitor 55 and a resistor 560, all connected in series.

The emitter of transistor 49 is connected, on the one hand, to resistor 380 via a resistor 57, and, on the other hand, to an output terminal 58 via the intermediary of a capacitor 59, this output terminal being itself connected to ground by a resistor 61. On the other hand, the collector of transistor 49 is connected to ground by a resistor 62 and via a capacitor 63 to another output terminal 64 which in turn is grounded by a resistor 65.

In the circuit just described, one and the same signal is applied to the gate and source electrodes of the input FET 29, and an identical signal is also applied between the gate and the source electrodes of the FET 45, mounted in opposition, whereby rejection of the common modes is achieved. Thereafter, the signal is amplified by the transistor 49 and the amplified signal $Vm$ appears between the output terminals 58 and 64.

The supply for the circuit 23 is furnished from the control bay C via the cable 650 through the sealed bushings 652 (FIG. 2), whereas the coaxial cable 22 introduces the signal furnished by the detector 20 immediately to the printed circuit 24, which carries all the elements constituting the impedance-matching circuit 23, with the coaxial cable 22 passing through the sealed tubular bushing 654, to which the protective sheath of the cable is attached.

Figure 4:
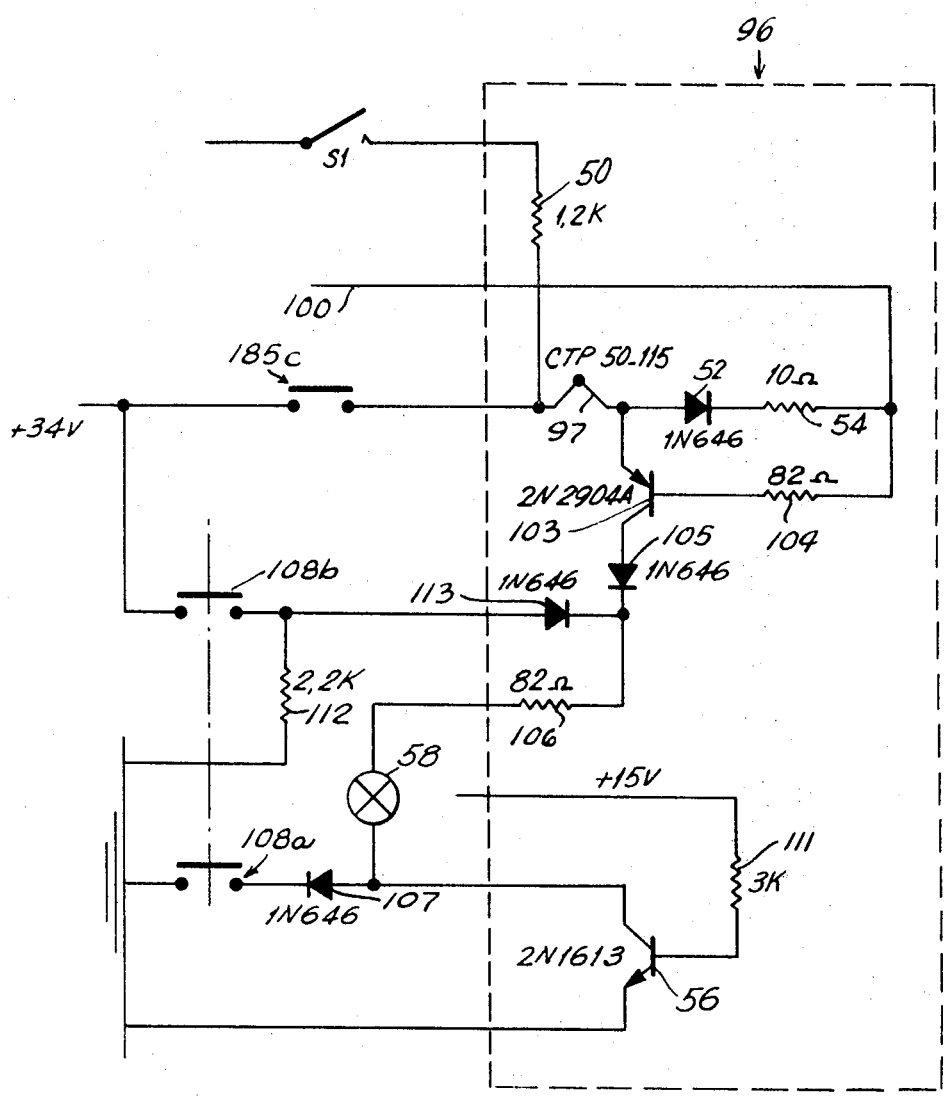
FIG. 4 is a schematic diagram of a control and protective circuit used in the network.

FIG. 4 is a schematic of a control and protective circuit 96 which forms part of each of the amplifier and control devices 5a-5n. The control and protective circuit 96 comprises a thermistor 97, a diode 52 and a small value (for example: 10 ohms) resistor 54, which are all connected in series by a pushbutton contact 185c of control assembly C between the +34-volt polarity point of the general power supply system and an output terminal 100 having the approximate potential +30 volts, and which is connected to the corresponding supply terminal 40 in the schematic of FIG. 3. Moreover, the junction point between the "ON" pushbutton contact 185c and the positive temperature coefficient of thermistor 97 is connected via a resistor 50 to an N/O contact 12c of a relay 12 (FIG. 11), this contact 12c being in turn connected to the relay 11 of FIG. 3. When the measurement transmission and control device 2a is connected to the assembly 5a, and the contact 185c is closed, the supply current will flow through thermistor 97, diode 98 and resistor 99, and the voltage appearing at the junction point between thermistor 97 and diode 98 causes a signal lamp 58 to light up. This lamp is connected in series with the emitter-collector circuit of a transistor 103, the base of which is connected to terminal 100 via a resistor 104, whereas its collector is connected to the signal lamp over a diode 105 and a resistor 106. On the other hand, the signal lamp 58 is connected to ground by a diode 107 and a contact 108z actuated by a "visual test" pushbutton 108 pertaining to the control assembly represented in FIG. 10. The signal lamp 58 is also connected to the collector of a NPN-type transistor 56, whose base is connected by a resistor 111 to the +15-volt polarity point, whereas its emitter is grounded.

When the device 2a is connected, the transistor 103 is "on" and a current flows through it through lamp 58 and through the transistor 109 so that the lamp is lit.

In the case of excessive supply current, the heating up of the positive temperature coefficient thermistor 97 causes a considerable increase in its resistance value so that the voltage across it becomes equal to the supply voltage. Thus, the power supply is protected and the normal operation of all other channels assured. In this case, the signal lamp, since it is connected upstream of the thermistor, goes out on account of the shutting off of transistor 103. Thus, the abnormal extinction of the signal lamp 58 signifies an open circuit or a short circuit.

For carrying out a visual checkup, another N/O contact 108b also closes upon actuation of the pushbutton 108. This N/O contact 108b is connected to the −34-volt supply and, on the other hand, to ground via a resistor 112 and, on the other hand, by a diode 113 to the junction point between diode 105 and the resistor 106. Simultaneous closing of the pushbutton contacts 108z and 108b will thus cause the signal lamp 102 to light up.

There will now be described on the basis of FIG. 5, a particular embodiment of the calibrating oscillator. The oscillator O essentially comprises three NPN-type transistors 114, 115 and 116, as well as on PNP-type transistor 117. These four transistors operate as emitter-followers. The collectors of the transistors 114, 115, 116 are joined and connected to the emitter of transistor 117 via the intermediary of an ohmic voltage divider formed by two resistors 118 and 119, in series. The junction point between resistor 118 and 119 is connected to the base of the transistor 114 and also via a resistor 121 to the collector of a transistor 122 which, together with another transistor 123, forms a differential amplifier. The emitter of transistor 114 is connected, on the one hand, to a first RC circuit formed by a capacitor 124 connected to the base of the transistor 115 and to a resistor 125, the other end of which is grounded and, on the other hand, to a second RC circuit formed by a resistor 126 connected to the base of transistor 116 and to a capacitor 127 leading to ground. The emitters of transistors 115 and 116 are interconnected by the resistors 128 and 129, the junction point of which is connected by a resistor 131 to the emitter of transistor 114. Moreover, a third RC circuit, formed by a resistor 132 and a capacitor 133 in series, is inserted between the emitters of transistors 115 and 116, and the junction point between resistor 132 and capacitor 133 is connected to the base of the transistor 117, the collector of which is connected to the junction point between the resistors 128 and 129.

These three RC circuits constitute an inverse double-T-bridge having separate legs, presenting a gain in excess of unity. Their time constants are governed by the relationships:

$$R_1 R_2 C^2_w{}^2 = 1 \quad \frac{R_1}{R} = a = \frac{R}{R_2}$$

Calculation reveals, that gain is achieved for $a = 0.41$, and this gain amounts to 1.21.

On this same principle, another version of the oscillator can be utilized. This version uses a staggered inverse double-T-bridge having separate legs, i.e., each of the first two circuits RC 124–125 and CR 126—127 is shunted in "staggered" arrangement by two identical circuits, connected between the emitters of transistors 114 and 115 for the first, and between the emitters of transistors 114 and 116 for the second RC circuit. The third circuit RC 132–133 is connected across the median points of said two added circuits by two additional PNP-type emitter-followers. In this version, all RC circuits are identical, the oscillation frequency is determined by the relationship: $RCw=1$
and the circuit gain amounts to 1.5.

The output signal from the oscillator of very stable frequency is derived from the junction point between the emitter of the transistor 114 and resistor 131 which, via a capacitor 132 and a resistor 133 in series, is connected to a power amplifier 134. The output of the amplifier 134 is connected by a capacitor 136 to the primary winding 137a of a transformer 137. This transformer possesses a counterreactive secondary winding 137b, having a tap connected to a calibrated circuit, illustrative of a plurality of taps making it possible to obtain four different output levels. This tap is connected, by the contacts 138a, of a corresponding pushbutton switch (Fig. 10) pertaining to the control assembly C, to the corresponding calibrating potentiometers 142. The pushbuttons correspond to the selection of four different levels of oscillator output voltage, associated to accelerations of 5, 10, 20 and 40 G's, respectively.

The slide contact of the potentiometer 142 is connected to the anode of a diode 146 and to one end of a resistor 147, the other end of which is connected to the transformer winding 137b. The resistor 147 is ground-connected by two series resistors 148 and 149. The cathode of the diode 146 is connected, on the one hand, to the base of the transistor 122 via a resistor 151 and, on the other hand, by a capacitor 152 to the resistor 148. The base of transistor 122 is connected to ground by a resistor 153 and to the resistor 148 via a resistor 154. The emitters of the transistors 122 and 123 are jointly connected to the resistor 148 by a capacitor 155 and a parallel resistor 156. The collector of transistor 123 is connected to the positive pole by a resistor 157 and its base is connected to the junction point between the resistors 148 and 149 via a diode 158 and also to the resistor 148 via a resistor 159.

The differential amplifier constituted by the transistors 122 and 123 furnishes a stabilizing feedback signal which is applied to the base of the transistor 114 for the purpose of stabilizing the operation of the oscillator.

The control assembly 6 will now be described with reference to Figs. 10 and 11.

In FIG. 10, there is represented the bay in which the equipment of the remote measuring network is assembled. This bay has in its upper portion a keyboard constituted by as many independent latch-in-type pushbuttons 185 as there are measuring channels, which pushbuttons control the placing in service of the individual measuring channels a–n. Each of the pushbuttons 185 controls four contacts, as can be seen in Fig. 11 for the channel a, namely, three contacts 185a, 185b and 185c, which are connected between the stabilized power supply 9, the amplification circuit 66 and the control and protective circuit 96 of the assembly 5a pertaining to channel a, respectively, and one contact 185d connected between power supply 9 and the relay 12. Each of the pushbutton controls 185 has a built-in signal light, similar to the lamp 58 of Fig. 4, which light serves for verification of the remote measuring channel as has been previously explained.

The control bay of Fig. 10 also contains four exclusive pushbuttons 138, 139, 140 and 141, which permit selection of one of the four "V" voltage levels of the calibrating oscillator, which correspond to accelerations of 5, 10, 20 and 40 G's, respectively. These pushbuttons, in addition to the contacts, such as 138a, 138b, etc., also actuate other contacts 138c, 139c, 140c and 141c, which control the lighting of the signal lamps 195, 196, 197 and 198 associated with the various pushbuttons.

Additionally, the control bay possesses three exclusive pushbutton controls 186, 197 and 188 which serve, respectively, for placing in service the calibrating oscillator, for shutting it down to carry out an actual conditions test, as well as a null checkup of the amplifier 169. A last, independent pushbutton 189 actuates general simultaneous calibration.

The pushbutton control 186 actuates four contacts 186a, 186b, 186c and 186d, connecting four outputs of the general power supply 9 to four corresponding inputs to the oscillator 6, via the intermediary of four N/C contacts 187a, 187 b, 187c, and 187d of the pushbutton control 187 for "actual condition" test. These latter contacts are open when the oscillator is not in service during measurement of the response of the different sensors to mechanical excitation.

The control bay, moreover, contains a keyboard of 16 exclusive latch-in-type pushbutton controls 191, which make it possible selectively to connect the oscillator output to whichever channel is to be calibrated, if that channel is energized, and to verify the channel output on the voltmeter 184 forming part of the measuring instrument 7. Each of the pushbutton controls actuates an N/O contact 191a, which is series connected with the relay 12 associated with the channel under consideration, in such a manner as to energize that relay whenever the two contacts 185d for switching on the channel, and 191a for calibrating the channel are closed. Energizing the relay 12 causes, due to the closing of its contact 12c, the energizing of relay 11 and, due to the closing of contacts 12a and 12 b, the placing in circuit of the variable capacitor 13. The closing of a fourth contact 12d of relay 12 causes a signal light 200 associated with the pushbutton control 191 of the channel in question to light up.

The pushbutton control 191 also actuates another contact 191b, which connects the output of the amplifier 66 of assembly 5a to the measuring instrument 7 in order to assure the calibration of each channel.

The pushbutton control 189 for general calibration causes the hookup of the oscillator 0, by the intermediary of its contact 189a, and of a diode logic circuit 190 of all energized channels, for recording of the calibration levels. These connections are effected by the relays 12 located in the control bay and by the relays 11 located in the measurement transmission and control devices 2a–2n. Yet another contact 189b of pushbutton control 189 takes care of lighting the signal lamp 199 associated with this pushbutton control.

A momentary contact pushbutton, corresponding to testing of the oscillator, allows checking the oscillator output on the measuring instrument. This control actuates two contacts 192a and 192b which connect the oscillator 0 to the measuring instrument 7.

Another momentary contact pushbutton control 108, serving for verification of the signal lamps, makes it possible to test all signal lamps in the control bay. This control actuates three contacts 108a, 108b and 108c, the first two of which permit checking the lights 102 associated with the pushbutton controls 185. The third contact 108c is connected with a diode logic circuit 201, in parallel with the various contacts 12d in order to permit checking the signal lights 200.

A general switch 193 energizes all channels simultaneously. Its pilot light 194 synthetizes operation of all the various supplies.

I claim:

1. A measuring circuit comprising a plurality of piezoelectric detectors having resonant frequencies and associated detector circuits, a calibration oscillator capable of generating a signal which is different from said resonant frequencies, and means for coupling said detector circuits to said oscillator, and cables coupling said detectors to said detector circuits, said means including an adjustable capacitor, said detector circuit having stray capacitances which together with said adjustable capacitor constitute capacitance voltage dividers.

2. A measuring circuit as claimed in claim 1 comprising sealed housings, a measuring instrument, and matching circuits coupling the detector circuits to the measuring instrument, said housings enclosing said dividers and matching circuits.

3. A measuring circuit as claimed in claim 2, wherein said oscillator generates a signal of constant frequency and one of a plurality of constant magnitudes, comprising control means to select one of said magnitudes.

* * * * *